United States Patent [19]
Matsko et al.

[11] Patent Number: 5,926,355
[45] Date of Patent: Jul. 20, 1999

[54] ELECTRICAL SWITCHING APPARATUS EMPLOYING BATTERY-POWERED INDICATOR

[75] Inventors: Joseph J. Matsko, Beaver; Richard A. Johnson; John A. Massoud, both of Aliquippa, all of Pa.

[73] Assignee: Eaton Corporation, Cleveland, Ohio

[21] Appl. No.: 08/964,450

[22] Filed: Nov. 4, 1997

[51] Int. Cl.⁶ ........................................ H02H 3/04
[52] U.S. Cl. ...................... 361/96; 361/94; 340/638
[58] Field of Search ................... 361/88, 89, 93, 361/94, 97, 96, 115; 335/6, 17, 166; 340/638; 364/528.27, 528.28, 528.29

[56] References Cited

U.S. PATENT DOCUMENTS

| | | | |
|---|---|---|---|
| 4,751,606 | 6/1988 | Matsko et al. | 361/93 |
| 5,270,898 | 12/1993 | Elms et al. | 361/96 |
| 5,341,191 | 8/1994 | Crookston et al. | 335/16 |

*Primary Examiner*—Ronald W. Leja
*Assistant Examiner*—Kim Huynh
*Attorney, Agent, or Firm*—Martin J. Moran

[57] ABSTRACT

A circuit breaker includes separable contacts for movement between a closed position and an open position. An operating mechanism moves the separable contacts between the closed and open positions and has a closed state and an open or tripped state which corresponds to the open position. A trip circuit senses electrical current flowing through the separable contacts, employs the sensed current to trip the operating mechanism to the tripped state to move the separable contacts to the open position, and provides plural status signals. A display circuit cooperates with the trip circuit and includes light emitting diodes for outputting the status signals. A battery powers the display circuit which further includes an oscillator circuit for modulating the LEDs to reduce power from the battery to the display circuit.

3 Claims, 3 Drawing Sheets

— 1 —
ELECTRICAL SWITCHING APPARATUS EMPLOYING BATTERY-POWERED INDICATOR

BACKGROUND OF THE INVENTION

1. Field of the Invention

This invention is directed to an electrical switching apparatus and, more particularly, to a circuit interrupter, such as a circuit breaker, including an indicator for indication of circuit interrupter status information.

2. Background Information

Electrical switching apparatus include, for example, circuit switching devices and circuit interrupters such as circuit breakers, contactors, motor starters, motor controllers and other load controllers. Circuit breakers are generally old and well known in the art. Examples of circuit breakers are disclosed in U.S. Pat. Nos. 4,751,606; and 5,341,191. Such circuit breakers are used to protect electrical circuitry from damage due to an overcurrent condition, such as an overload condition or a relatively high level short circuit or fault condition.

Molded case circuit breakers include a pair of separable contacts per phase which may be operated either manually by way of a handle disposed on the outside of the case or automatically in response to an overcurrent condition. Typically, such circuit breakers include an operating mechanism, which is designed to rapidly open and close the separable contacts, and a trip mechanism, which senses overcurrent conditions in an automatic mode of operation. Upon sensing an overcurrent condition, the trip mechanism trips the operating mechanism to a trip state which moves the separable contacts to their open position.

Some trip mechanisms employ a microprocessor to detect various types of overcurrent trip conditions, such as, for example, a long delay trip, a short delay trip, an instantaneous trip, or a ground fault trip. Some of those trip mechanisms employ indicators, such as light emitting diodes (LEDs), to indicate the cause of the trip condition by lighting one of the LEDs.

Because circuit breakers are normally powered by current transformers on the load side of the separable contacts, some trip mechanisms employ battery-powered latches and displays to display the cause of the trip. In this manner, even if power is removed from the circuit interrupter, the user may determine the condition which caused the trip. With the loss of circuit interrupter power, it is not possible to recharge the battery or to permanently maintain the charge of the battery. Hence, there is room for improvement in battery-powered trip condition indicators for electrical switching apparatus.

SUMMARY OF THE INVENTION

This need and others are satisfied by the invention, which is directed to an electrical switching apparatus. The apparatus includes output means having means for outputting one or more status signals provided by a trip means. A battery means powers the output means. A modulating means modulates the means for outputting to reduce power from the battery means to the output means.

Preferably, the modulating means includes oscillator means for oscillating with a duty cycle to alternately energize and deenergize the means for outputting. The means for outputting may include a plurality of indicator means for indicating a plurality of status signals. Each of the status signals, when active, cooperates with the oscillator means to energize a corresponding one of the indicator means. Otherwise, when each of the status signals is inactive, the oscillator means is deenergized to reduce the power from the battery means to the output means.

The electrical switching apparatus comprises separable contact means for movement between a closed position and an open position. An operating means moves the separable contact means between the closed and open positions. The operating means has a first state and a second state which corresponds to the open position. A trip means senses an electrical condition operatively associated with the separable contact means, employs the sensed electrical condition to trip the operating means to the second state to move the separable contact means to the open position, and provides at least one status signal. An output means cooperates with the trip means and includes means for outputting the at least one status signal. A battery means powers the output means which further includes modulating means for modulating the means for outputting to reduce power from the battery means to the output means.

As a preferred refinement, the output means further includes latch means powered by the battery means for latching the at least one status signal and providing at least one latched signal corresponding to the at least one status signal to the means for outputting. The output means may further include means for powering the modulating means with at least one of the at least one latched signal to reduce power output by the battery means to the output means when each of the at least one latched signal is inactive.

The latch means preferably includes a plurality of latches for latching a plurality of status signals and outputting a plurality of latched signals to the means for outputting. The means for powering the modulating means may include a plurality of diodes each of which is connected between one of the latches and the modulating means to power the modulating means when at least one of the latched signals is active.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENT

Figure 1:
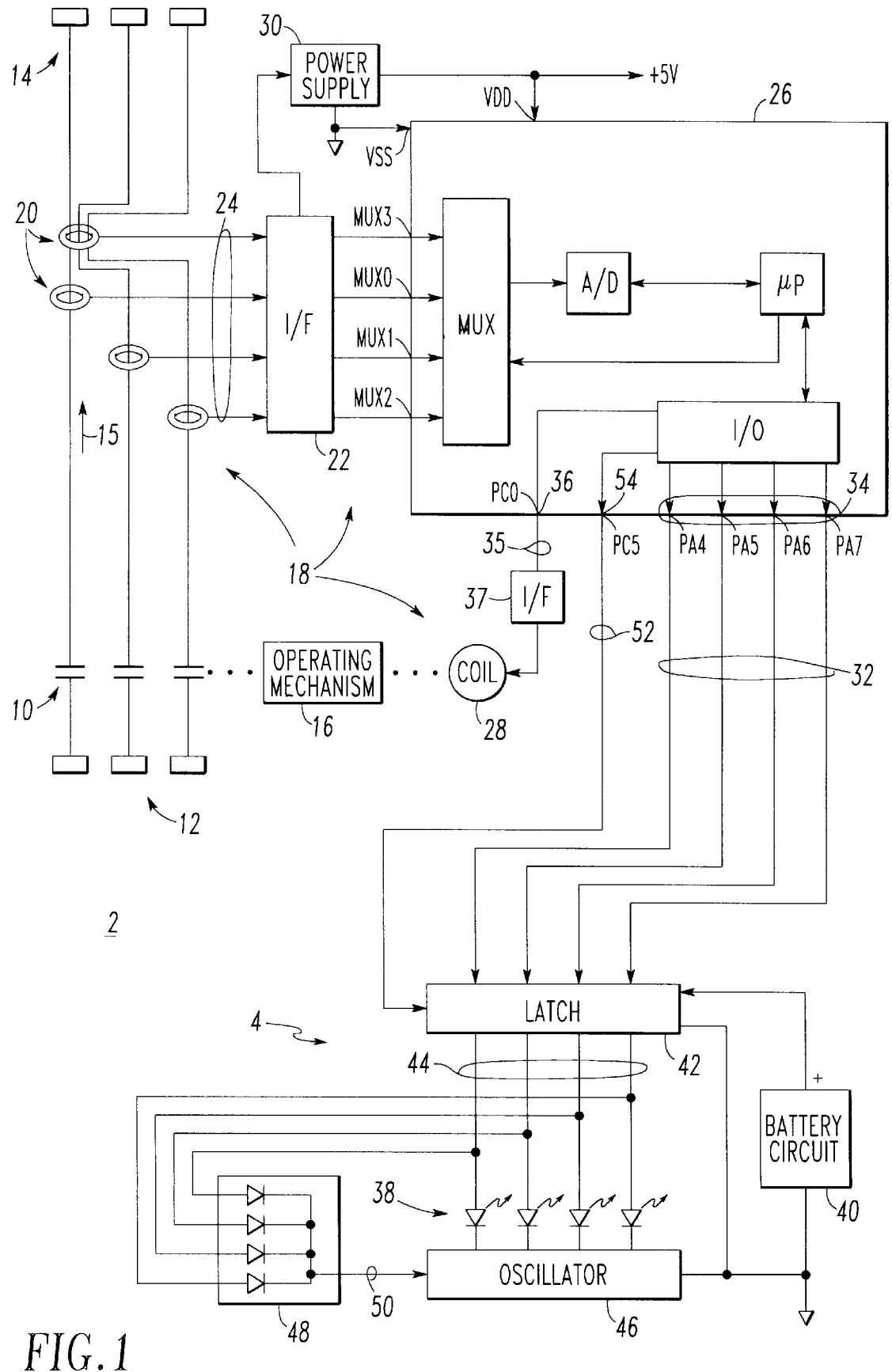
FIG. 1 is a block diagram of a circuit breaker including a display circuit in accordance with the invention.

Referring to FIG. 1, a circuit breaker 2 including an output circuit, such as the exemplary display circuit 4, is illustrated. A typical example of a circuit breaker is disclosed in U.S. Pat. No. 4,751,606, which is incorporated by reference herein. The circuit breaker 2 includes one or more separable contacts 10 electrically interconnected between line terminals 12 and load terminals 14 for movement between a closed position (not shown) and an open position (as shown in FIG. 1) in order to switch one or more electrical currents, such as current 15, flowing between the terminals 12,14. The circuit breaker 2 also includes an operating mechanism 16 for moving the separable contacts 10 between the closed and open positions, and a trip circuit 18. The trip circuit 18 includes sensors, such as current transformers (CTs) 20, for sensing the line and ground electrical currents; a suitable interface (I/F) 22 for receiving the sensed current signals 24 from the CTs 20; a microcomputer 26, such as a Sure Chip Plus™; a trip coil 28 driven by the microcomputer 26; and a power supply 30, which is self-derived through I/F 22 from CT current to voltage transformation, providing a voltage +5V to power the microcomputer 26. An example of the exemplary Sure Chip Plus™ microcomputer 26 is disclosed in U.S. Pat. No. 5,270,898, which is incorporated by reference herein. The power supply 30 is powered from the load side of one or more of the separable contacts 10.

The microcomputer 26 employs a multiplexer (MUX) to select the sensed current signals 24 from I/F 22; an analog-to-digital (A/D) converter to convert the analog current signals 24 to corresponding digital values; a microprocessor (μP) to receive the digital values from the A/D; and a digital input/output circuit (I/O) to input various input signals (not shown) and output various output signals, such as signals 32 at output port lines 34 and signal 35 at output port line 36.

The operating mechanism 16 has a first state (e.g., closed) and a second state (e.g., open or tripped) which corresponds to the open position of the separable contacts 10. The CTs 20 of the trip circuit 18 sense the electrical current, such as current 15, flowing through the separable contacts 10. The μP of the microcomputer 26 employs the digital values of the sensed current signals 24 from the A/D to generate the trip signal 35 at output 36 for tripping the operating mechanism 16 through interface (I/F) 37 and trip coil 28 to the tripped state to move the separable contacts 10 to the open position.

As disclosed in U.S. Pat. No. 4,751,606, the exemplary status signals 32 include status signals representative of a long delay trip, a short delay trip, an instantaneous trip, and a ground fault trip of the operating mechanism 16 by the trip circuit 18. The display circuit 4 cooperates with the trip circuit 18 and includes lights, such as light emitting diodes (LEDs) 38, for displaying the status signals 32.

The display circuit 4 includes the LEDs 38; a battery circuit 40 for supplying power; an exemplary quad-latch 42 powered by the voltage of the battery circuit 40 for latching the status signals 32 and providing corresponding latched status signals 44 to the LEDs 38; and a modulating circuit, such as oscillator 46, for modulating the LEDs 38 to reduce power from the battery circuit 40 to the rest of the display circuit 4. Disposed between the latch 42 and the oscillator 46 is a diode circuit 48 for powering the oscillator 46. Each of the diodes of the diode circuit 48 is connected between one of the latches of the exemplary quad-latch 42 and the oscillator 46 to provide a voltage 50 which powers the oscillator 46 when at least one of the latched signals 44 is active. On the other hand, whenever each of the latched signals 44 is inactive, no power is supplied to the oscillator 46 through the diode circuit 48, thereby reducing the power output by the battery circuit 40 to the rest of the display circuit 4.

Figure 2:
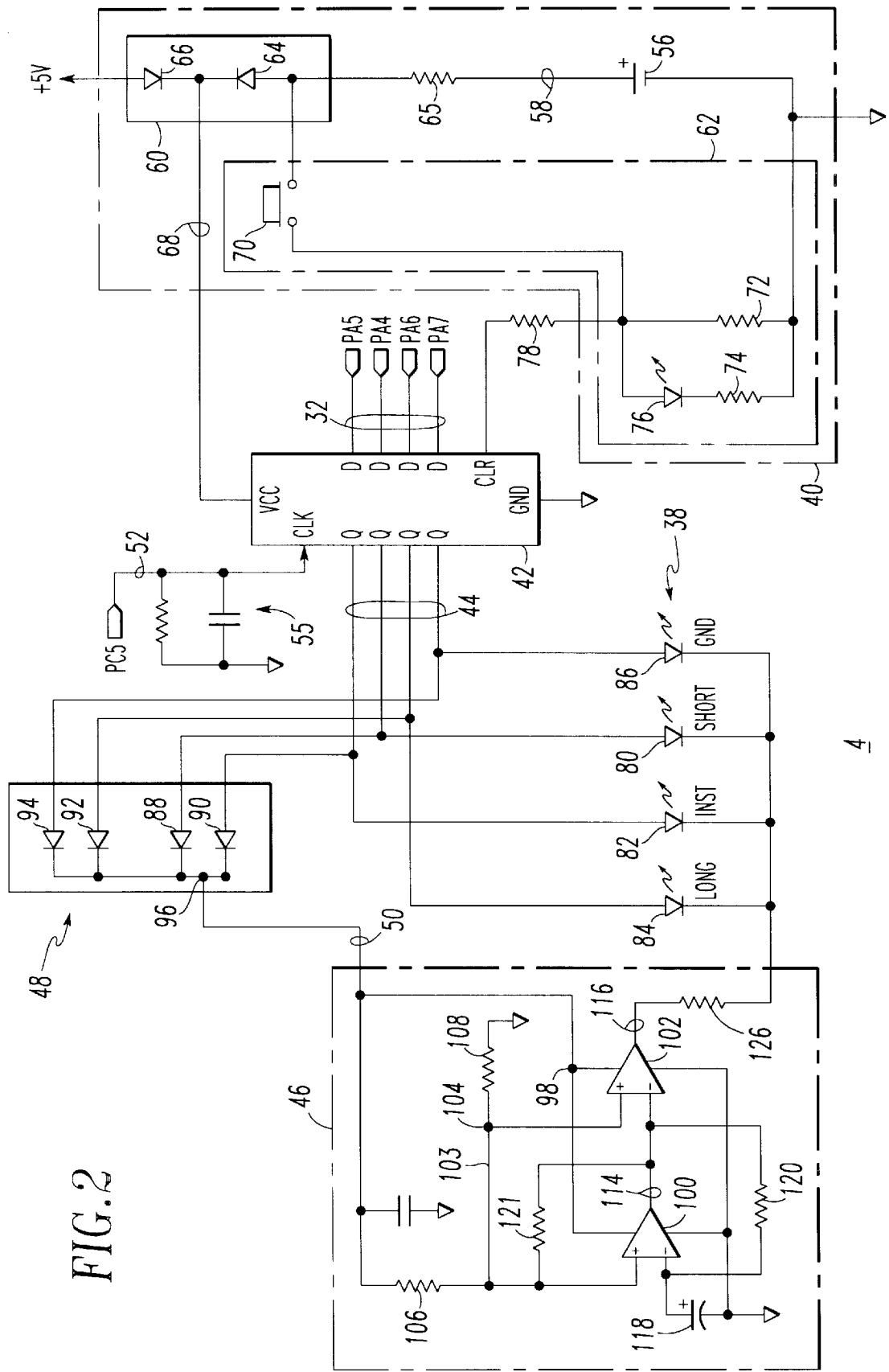
FIG. 2 is functional block diagram in schematic form of the display circuit of FIG. 1.

Referring to FIG. 2, the display circuit 4 is illustrated. The digital input/output circuit (I/O) of microcomputer 26 generates four status signals 32 at outputs 34 (labeled PA4,PA5, PA6,PA7) and one control signal 52 at output port line 54 (labeled PC5) of FIG. 1 for output to the four D-inputs and the CLK-input, respectively, of the quad-latch 42. An R-C circuit 55 is disposed at the CLK-input of the latch 42 to provide enhanced noise immunity. During a trip operation in the microcomputer 26, one of various trip conditions (e.g., a long delay trip, a short delay trip, an instantaneous trip, a ground fault trip) is detected, although a subset of those trip conditions and/or a wide variety of other trip conditions are possible. The microcomputer 26 designates the trip condition which caused the trip by asserting one of the status signals 32 and, then, pulsing the control signal 52 to latch the status signals 32 in the D-latches of the exemplary quad-latch 42. In turn, the latched signals 44 are output by the Q-outputs of the quad-latch 42.

The battery circuit 40 includes a battery 56, such as a Lithium primary cell, having a voltage 58; an auctioneering circuit 60 for auctioneering the voltage 58 of the battery 56 and the voltage +5V of the power supply 30 of FIG. 1; and a reset/test circuit 62 for resetting the latch 42 and testing the battery 56.

The auctioneering circuit 60 includes diodes 64,66 connected at their cathodes to output a voltage 68 to the VCC power input of the latch 42. The voltage 58 of the battery 56 is input to the anode of diode 64 through resistor 65 and the voltage +5V is input to the anode of diode 66.

The reset/test circuit 62 includes a normally open pushbutton 70, resistors 72,74, and an LED indicator 76. During a reset/test operation, the user depresses the pushbutton 70 which applies the voltage 58 of the battery 56 across the series combination of the resistor 65, the closed pushbutton 70, and the resistor 72 which is in parallel with the series combination of LED 76 and resistor 74. If the condition of the battery 56 is good (i.e., the voltage 58 is of sufficient magnitude), then sufficient current flows through LED 76 and resistor 74 to light the LED 76 and, thus, indicate the good condition of the battery 56. The CLR-input of latch 42 and resistor 78 form a reset input for clearing the latch 42. At the same time that LED 76 is lit, the voltage across resistor 72 is applied through resistor 78 to the CLR-input of latch 42 to reset the latched signals 44 to the inactive state. On the other hand, if the condition of the battery 56 is bad, then insufficient voltage is applied across resistor 72, such that LED 76 is not lit and latch 42 is not reset by the voltage applied through resistor 78 to the latch's CLR-input.

Before a trip operation, the display circuit 4 is powered by power supply 30 of FIG. 1 through diode 66. During the trip operation, the microcomputer 26 of FIG. 1 outputs a "high" (i.e., a logic one) on one of its exemplary outputs, PA4,PA5, PA6,PA7, to the corresponding D-inputs of the exemplary quad-latch 42. The logic one is clocked into the appropriate latch of the quad-latch 42 by the clock signal 52 on output 54, PC5, also coming from the microcomputer 26. The quad-latch 42 then sets the corresponding Q-output to a logic one. After the trip operation, the power supply 30 is disabled, as the separable contacts 10 are open, and the power for LEDs 38 and display circuit 4 is provided from battery 56.

The LEDs 38 include a short delay trip LED (SHORT) 80, an instantaneous trip LED (INST) 82, a long delay trip LED (LONG) 84, and a ground fault trip LED (GND) 86. The anodes of the LEDs 38 are connected to the corresponding Q-outputs of the quad-latch 42. The LEDs 38 indicate the state of the latched signals 44 and, thus, the state of the status signals 32. Although the exemplary embodiment indicates, at most, only one of the exemplary status signals 32 at one time, other embodiments which indicate two or more of various signals are possible.

The diode circuit 48 includes four diodes 88,90,92,94, the anodes of which are also connected to the corresponding Q-outputs of the quad-latch 42. The cathodes of the diodes 88,90,92,94 are connected in common to form an output 96 which provides the voltage 50 to power the oscillator 46. The diodes 88,90,92,94 are connected between one of the D-latches of the quad-latch 42 and the oscillator 46 to suitably power the oscillator 46. Whenever at least one of the latched signals 44 is active, the voltage 50 energizes the oscillator 46, with the power input 98 of the two operational amplifiers 100,102 being energized through one or more of the diodes 88,90,92,94. Each of the latched signals 44, when active, cooperates with the oscillator 46 to energize a corresponding one of the LEDs 38 at a duty cycle which is set by the oscillator 46. On the other hand, with each of the latched signals 44 being inactive, the voltage 50 is essentially at ground potential and the oscillator 46 is deenergized to reduce the power from the battery 56 to the rest of the display circuit 4.

Figure 3A:
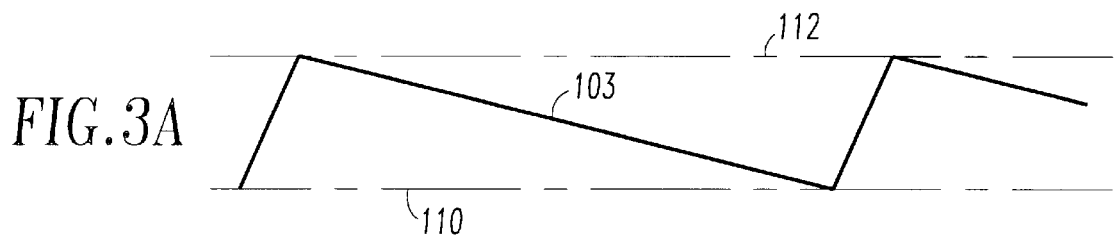
FIG. 3A is a plot of level at node 104 of the FIG. 2.
Figure 3B:
FIG. 3B is a plot of the output voltage 114 of the operational amplifier 100 of FIG. 2.

Continuing to refer to FIG. 2, whenever at least one of the latched signals 44 is active, the resulting voltage 50 provides a voltage reference level 103 at node 104 for the "+" inputs of the operational amplifiers 100,102 as set by a divider formed by resistors 106,108. As shown in FIG. 3A, the voltage reference 103 has two voltage level values 110, 112 (e.g., +0.1 V, +0.75 V, respectively) depending on whether the output voltage 114 (as shown in FIG. 3B) of the output of operational amplifier 100 is high or low. The shift in the voltage reference 103 between the two voltage levels 110, 112 provides the difference in the resulting "on" and "off" states of output voltage 116 (as shown in FIG. 3C) of the output of operational amplifier 102.

On power up of the operational amplifiers 100,102, after the trip operation, the voltage of the "−" input of operational amplifier 100 is lower than the voltage of the "+" input of such operational amplifier and, thus, the output voltage 114 of the output thereof goes high and charges capacitor 118 through resistor 120. When the voltage across capacitor 118 reaches about the upper voltage level 112 (e.g., about 0.75 V) of the "+" input of operational amplifier 100, the output voltage 114 goes low, thereby forcing through feedback resistor 121 the voltage 103 at node 104 to the voltage level 110 (e.g., about 0.1 V). Then, capacitor 118 discharges through resistor 120 until its voltage reaches about the lower voltage level 110 (e.g., about 0.1 V) which, in turn, causes the output voltage 116 of the output of operational amplifier 102 to go high and, also, causes the recharging of capacitor 118.

Figure 3C:
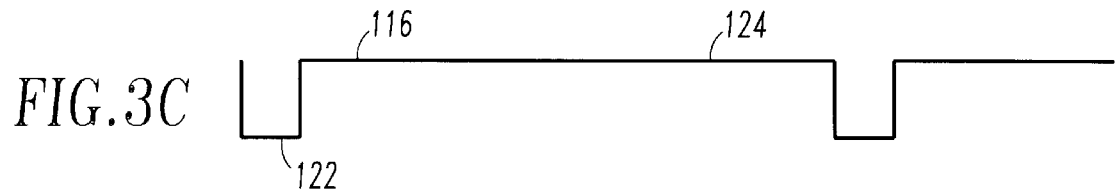
FIG. 3C is a plot of the output voltage 162 of the operational amplifier 102 of FIG. 2.

The LED of interest of the LEDs 38, as selected by the set Q-output of the quad-latch 42, is lit through resistor 126 when the output signal 116 (as shown in FIG. 3C) of the output of operational amplifier 102 is a low level 122, and is extinguished when that output signal 116 is a high level 124.

The small amount of energy consumed in the two operational amplifiers 100,102, under a trip condition, provides a large reduction in energy for the lit LED of interest of the LEDs 38. The oscillator 46 oscillates to alternately energize and deenergize the LED of interest at an exemplary duty cycle of about 12.5%, rather than turning that LED on continuously. Moreover, the period between consecutive low level pulses 122 may be suitably selected such that the resulting flashing of the LED is easily noticed by the user. Although an exemplary 12.5% duty cycle is illustrated, the invention is applicable to a wide range of duty cycles which provide battery power reduction. For purposes of illustration, but not limitation, an oscillator having a duty cycle of about 10% to 20% may be employed.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. An electrical switching apparatus, comprising:

separable contact means for movement between a closed position and an open position;

operating means for moving said separable contact means between the closed position and the open position thereof, said operating means having a first state and a second state which corresponds to the open position of said separable contact means;

trip means for sensing an electrical condition operatively associated with said separable contact means and employing the sensed electrical condition to trip said operating means to the second state thereof to move said separable contact means to the open position thereof, with said trip means providing at least one status signal;

output means cooperating with said trip means and including means for outputting said at least one status signal;

battery means for powering said output means;

with said output means further including modulating means for modulating said means for outputting to reduce power from said battery means to said output means;

wherein said output means further includes latch means powered by said battery means for latching said at least one status signal and providing at least one latched signal corresponding to said at least one status signal to said means for outputting;

wherein said output means further includes means for powering said modulating means with at least one of said at least one latched signal to reduce power output by said battery means to said output means when each of said at least one latched signal is inactive; and wherein said at least one status signal is a plurality of status signals; wherein said latch means includes a plurality of latches for latching said status signals and outputting a plurality of latched signals to said means for outputting; and wherein said means for powering said modulating means includes a plurality of diodes each of which is connected between one of the latches and said modulating means to power said modulating means when at least one of the latched signals is active.

2. An electrical switching apparatus, comprising:

separable contact means for movement between a closed position and an open position;

operating means for moving said separable contact means between the closed position and the open position thereof, said operating means having a first state and a second state which corresponds to the open position of said separable contact means;

trip means for sensing an electrical condition operatively associated with said separable contact means and employing the sensed electrical condition to trip said operating means to the second state thereof to move said separable contact means to the open position thereof, with said trip means providing at least one status signal;

output means cooperating with said trip means and including means for outputting said at least one status signal;

battery means for powering said output means;

with said output means further including modulating means for modulating said means for outputting to reduce power from said battery means to said output means;

wherein said trip means includes a microcomputer and means for providing a first voltage which powers the microcomputer; and wherein said battery means includes a second voltage which powers said output means;

wherein said output means further includes latch means powered by the second voltage for latching said at least one status signal; and wherein the microcomputer includes means for outputting said at least one status signal to said latch means; and wherein said at least one status signal is a plurality of status signals; wherein said latch means latches the status signals and outputs a plurality of latched signals to said means for outputting; and wherein said output means further includes a plurality of diodes each of which is connected between one of the latches and said modulating means to provide a third voltage which powers said modulating means when at least one of the latched signals is active.

3. An electrical switching apparatus, comprising:

separable contact means for movement between a closed position and an open position;

operating means for moving said separable contact means between the closed position and the open position thereof, said operating means having a first state and a second state which corresponds to the open position of said separable contact means;

trip means for sensing an electrical condition operatively associated with said separable contact means and employing the sensed electrical condition to trip said operating means to the second state thereof to move said separable contact means to the open position thereof, with said trip means providing at least one status signal;

output means cooperating with said trip means and including means for outputting said at least one status signal;

battery means for powering said output means;

with said output means further including modulating means for modulating said means for outputting to reduce power from said battery means to said output means;

wherein said output means further includes latch means powered by said battery means for latching said at least one status signal and providing at least one latched signal corresponding to said at least one status signal to said means for outputting; and wherein said output means further includes means for powering said modulating means with at least one of said at least one latched signal to reduce power output by said battery means to said output means when each of said at least one latched signal is inactive.

* * * * *